United States Patent [19]
Williams

[11] Patent Number: 5,948,296
[45] Date of Patent: Sep. 7, 1999

[54] WIRE WHEEL ADAPTER FOR MIG WELDER

[75] Inventor: Scott J. Williams, Green Bay, Wis.

[73] Assignee: Illinois Tool Works Inc., Glenview, Ill.

[21] Appl. No.: 09/028,136

[22] Filed: Feb. 23, 1998

[51] Int. Cl.$^6$ .................................................. B23K 9/133
[52] U.S. Cl. .................... 219/137.2; 242/128; 242/129.5
[58] Field of Search .............................. 219/137.2, 137.7, 219/136; 242/128, 129, 129.5; 411/136, 143, 162

[56] References Cited

U.S. PATENT DOCUMENTS

| | | | |
|---|---|---|---|
| 2,776,416 | 5/1957 | Ryaby | 411/136 |
| 3,731,888 | 5/1973 | Cassel | 242/129 |
| 4,471,921 | 9/1984 | Corbin | 242/129 |
| 4,934,627 | 6/1990 | Mac Neil | 242/128 |

OTHER PUBLICATIONS

Millermatic 185 and M–15 Gun Owner's Manual—By Miller Electric dated Dec. 1997—No. OM–1313.

Primary Examiner—Patrick Ryan
Assistant Examiner—Anjan Dey
Attorney, Agent, or Firm—Mark W. Croll; Thomas W. Buckman; John P. O'Brien

[57] ABSTRACT

An adapter enables a conventional MIG welding machine to successfully use spoked wire wheels on which weld wire is wound. The adapter assembles over a rotatable hub that is also conventional. The adapter has a notch that mates without backlash with a post on the hub, thereby assuring that the hub and adapter rotate together. The adapter also has tabs that engage spokes of the wire wheel without backlash. Accordingly, the wire wheel and hub rotate together without backlash. A frictional drag on the hub is transmitted by the adapter to the wire wheel, so that normal operation of the welding machine does not cause wire wheel coasting and unraveling of the weld wire. The adapter allows field retrofit of existing welding machines so they can use the wire wheel in place of prior wire spools. In a modified embodiment, the adapter is made of two parts that are angularly adjustable relative to each other to enable the adapter to engage the spokes of different wire wheels.

15 Claims, 4 Drawing Sheets

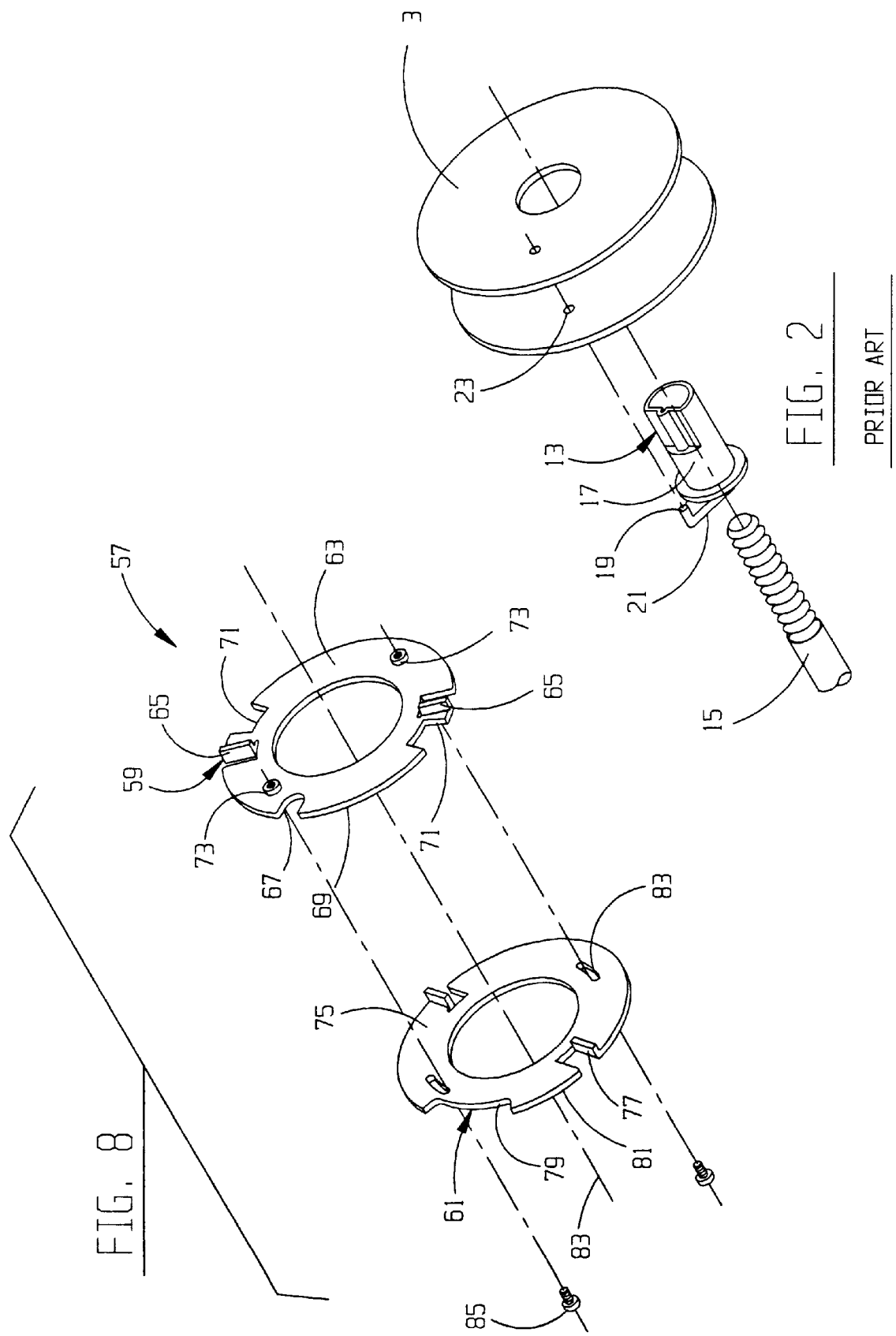

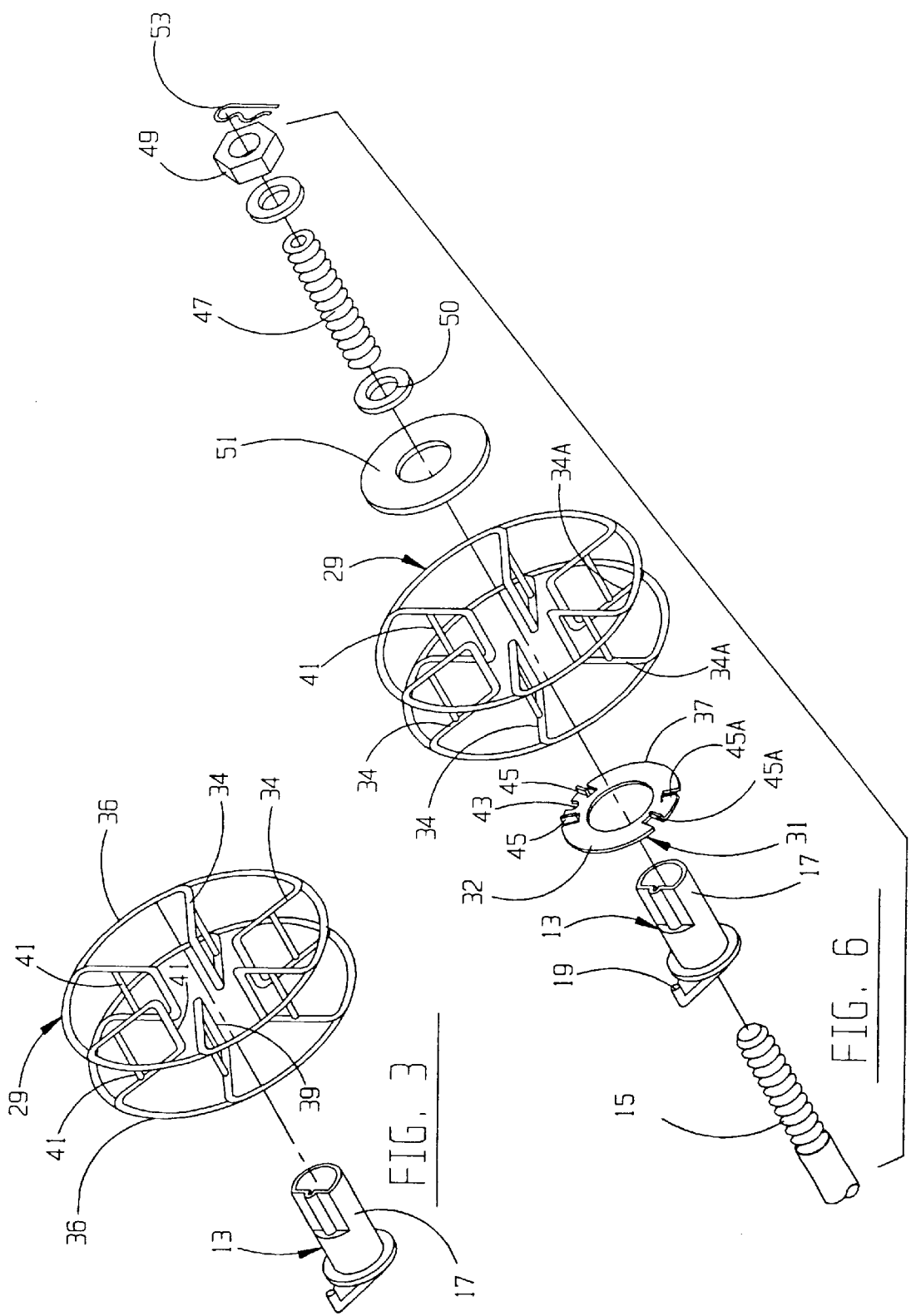

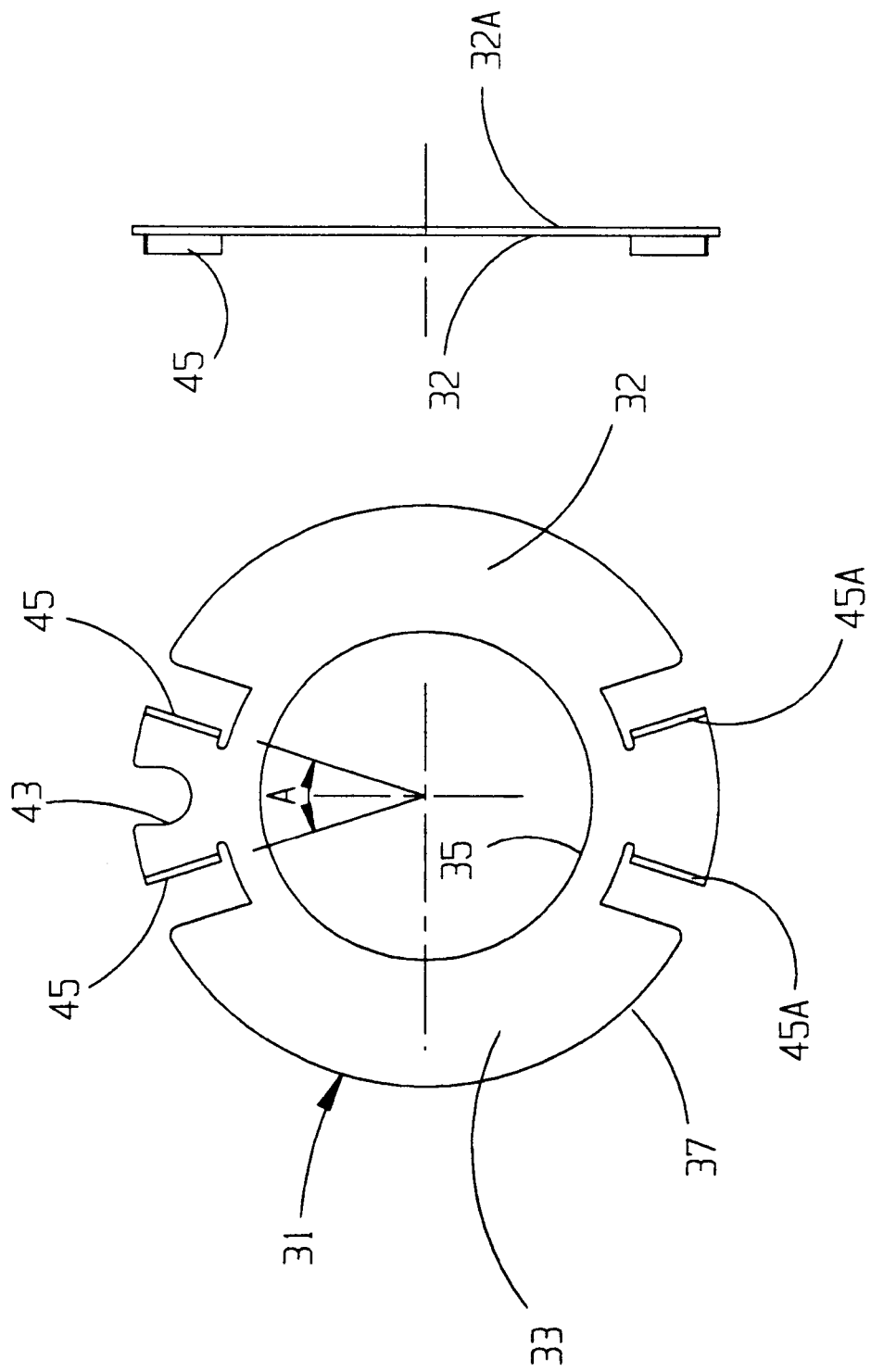

WIRE WHEEL ADAPTER FOR MIG WELDER

BACKGROUND OF THE INVENTION

1. Field of the Invention.

This invention pertains to wire welding, and more particularly to apparatus for feeding weld wire to a welding gun.

2. Description of the Prior Art.

MIG welding requires a smooth and constant feeding of consumable weld wire into a weld arc and puddle in order to join metal together. Erratic wire feeding produces weak, poor, and unattractive welds. Erratic wire feeding also causes "burn-back" and frozen tip conditions at the welding gun, which slows the welding process.

Modern MIG welding equipment typically includes a system for supplying the weld wire to the welding gun. For example, the Millermatic 130XP welding machine manufactured by the Miller Electric Manufacturing Company of Appleton, Wis. represented by reference numeral 1 in FIG. 1, utilizes an 8-inch to 12-inch diameter reel or spool 3 on which is wound a long length of the weld wire 5. The prior weld wire spools 3 have been made of fiberboard, plastic, or wood. The weld wire 5 is fed by a pair of pinch rollers of a feed drive 7 through a flexible cable 9 to the welding gun 11. The pinch rollers rotate to pull the wire 5 from the spool 3 and feed it to the gun 11 when the gun is performing a welding operation. The pinch rollers stop pulling and feeding the wire when no welding is taking place.

The spool 3 of weld wire 5 possesses considerable rotational inertia. Consequently, without proper drag on the spool, starting and stopping the feed mechanism 7 during a welding process can induce a coasting of the spool after the pinch rollers stop pulling the weld wire. If the spool does not stop rotating immediately when the pinch rollers stop, the weld wire can unravel from the spool. The unraveled weld wire can produce binding and tangling upon the next advancement of the wire by the pinch rollers. The binding and tangling can lead to erratic wire feeding for subsequent welds. In some cases, an electrical hazard can exist when electrically charged weld wire unravels and contacts the welding machine case to produce arcing.

To prevent the wire spool 3 from coasting and the attendant problems as abrupt stops and starts are imparted to it, it is known to provide a brake/tensioning mechanism to the spool. The above-mentioned Miller Electric welding machine 1, for example, employs a spring loaded friction force to create a drag between a hub 13 and a fixed shaft 15 on which the hub rotates. Also see FIG. 2. The wire spool 3 fits loosely over a tubular section 17 of the hub 13. A small post 19 on a flange 21 of the hub mates with a hole 23 in the spool 3, such that the spool and hub rotate together. That is, the post 9 and hole 23 arrangement prevent backlash between the hub and spool. As the weld wire 5 is fed by the pinch rollers, the constant friction drag on the hub prevents spool coasting and wire unraveling during normal start and stop welding operations.

The prior brake-tensioning mechanism has worked very well over the years and many thousands of them are in current use. However, the prior wire spools 3 with the hole 23 for the hub post 19 are evolving into recyclable steel wheels that are more economical than the prior fiberboard and plastic spools. The new steel wheels are in wire form, and they have no specific diameter hole to fit the hub post. Consequently, using the wire formed wheels reintroduces erratic weld wire feeding, even though the wire formed wheel fits over the friction restrained hub 13 in the same way as the prior spools.

SUMMARY OF THE INVENTION

In accordance with the present invention, a wire wheel adapter for a MIG welding machine is provided that enables a constant restraining force against rotation to be applied to wire wheels. This is accomplished by forming the adapter to simultaneously engage spokes on the wire wheel and a hub of a conventional weld wire feeding system.

The hub is rotatable on a fixed shaft of the welding machine. The hub is restrained against rotation on the shaft by a conventional brake/tensioning mechanism between the shaft and the hub. The wire wheel fits over the hub.

The adapter is preferably made in an annular shape from a thin piece of rigid material. It has an inner diameter that fits over the hub. The adapter has a notch that is mateable with a post of the hub. The post and notch cooperate to prevent backlash between the hub and adapter.

The adapter is further formed with at least one pair of tabs that project from the plane of the annular section. The tabs are shaped and spaced apart so as to simultaneously engage opposite sides of two spokes of the wire wheel. Consequently, there is no backlash between the adapter and the wire wheel.

In operation, weld wire is unwound from the wire wheel and is fed to the welding machine gun by the machine weld wire feed drive in the normal way. The rotation of the wire wheel is restrained by the spring loaded friction mechanism acting between the hub and the welding machine post and by the lack of backlash between the wire wheel and the adapter. Consequently, the weld wire does not unravel because of coasting of the wire wheel during welding operations.

In a modified embodiment of the invention, the adapter is adjustable so as to enable it to conform to the spacing of the spokes in different wire wheels. For that purpose, the adapter is made of two parts that are rotatable relative to each other about a common longitudinal axis. The first part has an annular section with a notch and a projecting pair of tabs. The first part further has a pair of openings and threaded bosses in the annular section. The second part has an annular section with a pair of tabs. The second part annular section defines a recess and slots.

The modified adapter is used by placing the annular sections of the two parts in facing contact and fastening them together with screws that pass through the slots in the second part and thread into the bosses in the first part. The tabs of the second part protrude through corresponding openings in the first part, and the recess in the second part overlaps the notch in the first part. The two parts are angularly rotatable relative to each other to thereby vary the spacing between the tabs of the two parts. In that manner, the adapter can be adjusted to suit the spoke spacings of different wire wheels.

The method and apparatus of the invention, using an adapter interposed between a conventional MIG welding machine hub and a wire wheel, thus enables proper feeding of weld wire from the wire wheel. Prior welding machines are easily upgraded to successfully handle wire wheels instead of the prior spokeless wire spools because no alterations are required to the machines themselves.

Other advantages, benefits, and features of the present invention will become apparent to those skilled in the art upon reading the detailed description of the invention.

BRIEF DESCRIPTION OF THE DRAWINGS

FIG. 2 is a perspective view of a portion of a prior wire spool on the welding machine of FIG. 1.

FIG. 3 is a perspective view of a hub and wire wheel.

FIG. 4 is a front view of the adapter of the present invention.

FIG. 5 is a side view of FIG. 4.

FIG. 6 is a perspective view of the adapter assembled with the wire wheel and hub.

FIG. 8 is an exploded perspective view of a modified embodiment of the invention.

DETAILED DESCRIPTION OF THE PREFERRED EMBODIMENT

Figure 1:
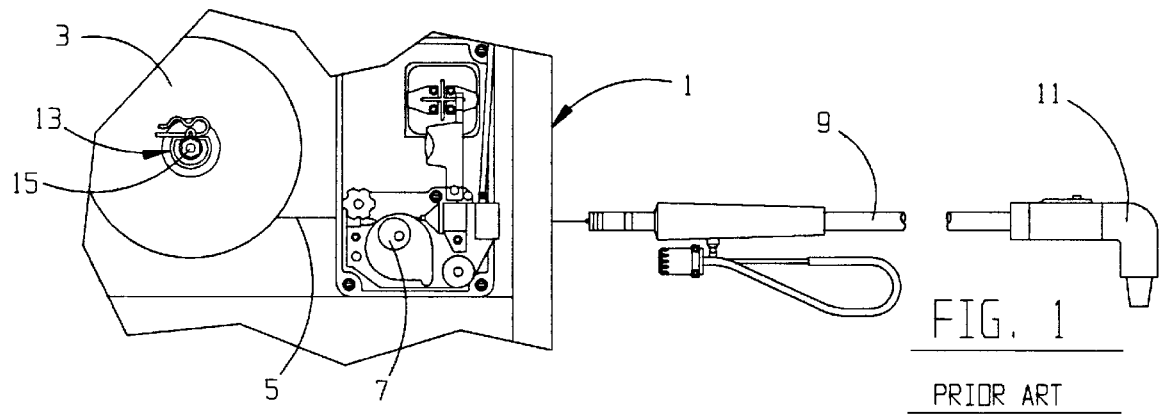
FIG. 1 is a partially broken side view of a typical MIG welding machine that advantageously employs the present invention.

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Referring to FIGS. 4-5, an adapter 31 is illustrated that includes the present invention. The adapter 31 is used in conjunction with a wire wheel 29 (FIG. 3) to provide correct feeding of weld wire in a MIG welding machine. In one design, the wire wheel is constructed with a number of angularly spaced pairs of spokes 34 connected to two outer rings 36. At their inner ends, the spokes 34 are joined by longitudinally extending inner connections 39. The inner connections 39 are circumferentially spaced to fit over the tubular section 17 of the hub 13. The weld wire is wound over outer connectors 41 between the inner connections and the outer rings 36.

In the illustrated construction, the adapter 31 is formed from a thin flat piece of rigid material, such as steel. The adapter has an annular section 33 with opposed flat faces 32 and 32A. The annular section 33 is further defined by an inner diameter 35 and an outer diameter 37. The inner diameter 35 is sized to fit over the tubular section 17 of the hub 13, FIG. 6. There is a notch 43 in the adapter annular section. The notch 43 is shaped and sized to receive the post 19 when the adapter is placed on the hub tubular section. The adapter is further formed with at least one pair of tabs 45 that are cut from and bent at right angles to the face 32 of the annular section. Preferably, there is also a second pair of tabs 45A cut from and bent at right angles to the face 32. Each pair of tabs 45 and 45A is designed to lie proximate opposite sides of two spokes 34 and 34A, respectively, of the wire wheel 29 when both the adapter and the wire wheel are on the hub tubular section. I have found that an adapter 31 made from cold rolled steel approximately 0.05 inches thick works very well. A suitable inner diameter is 2.13 inches, and a suitable outer diameter 37 is approximately 3.78 inches. I prefer that the notch 43 and tabs 45, 45A be stamped from a blank of material, and the tabs bent at 90 degrees to the annular section 33. A length of approximately 0.50 inches and a width of approximately 0.13 inches are satisfactory for the tabs. For most wire wheels 29, an angle A of 36 degrees between the adapter tabs 45, 45A is required. That angle assures that the tabs simultaneously contact, with only a slight clearance, opposite sides of two adjacent spokes 34 of the wire wheel.

Figure 7:
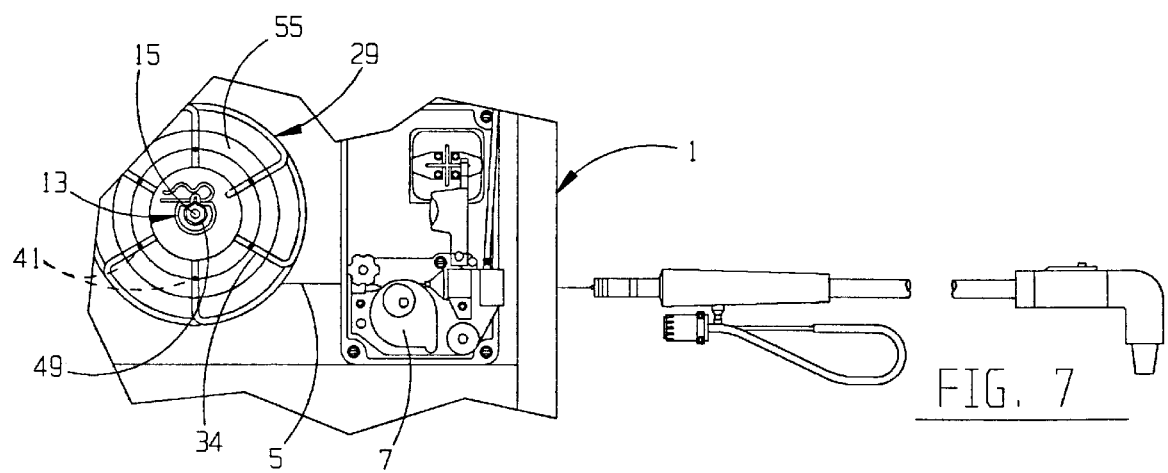
FIG. 7 is a view similar to FIG. 2, but showing a wire wheel in use on the welding machine.

FIGS. 6 and 7 show the adapter 31 assembled to the hub 13. The hub is assembled over the welding machine shaft 15. A spring 47 is adjustably compressed against an internal shoulder of the hub by a nut 49 such that a frictional drag is imposed by the washer 50 on the hub against rotation on the shaft. The adapter is placed on the hub tubular section 17 such that the hub post 19 mates with the adapter notch 43. The wire wheel 29 is then placed on the hub tubular section such that two spokes 34 engage the adapter tabs 45 and two spokes 34A engage the tabs 45A. A washer 51 and hitch pin 53 complete the assembly.

In operation, weld wire 5 is wound, as represented by reference numeral 55, around the connectors 41 of the wire wheel 29. The weld wire is pulled from the wire wheel and fed to the welding gun 11 by the welding machine feed drive 7 in the usual manner. Because of the adapter 31, stop and start welding operations produce intermittent but identical rotations of the wire wheel and hub 13 on the shaft 15. The spring-loaded frictional drag on the hub, as adjusted by the nut 49, prevents any coasting of the wire wheel. By using the adapter, existing welding machines 1 can easily be retrofit to successfully use the modern wire wheel.

Turning to FIG. 8, a modified adapter 57 is shown. The adapter 57 has a first part 59 and a second part 61. The first part 59 has a flat annular section 63 with two tabs 65 projecting from the annular section. There is a notch 67 in the first part periphery 69. There also are two openings 71 in the first part periphery 69. A pair of threaded bosses 73 are formed in the annular section 63.

The second part 61 has an annular section 75 with tabs 77. There is an elongated recess 79 in the periphery 81 of the second part. The annular section 75 defines a pair of curved slots 83.

The adapter 57 is used by bringing the annular sections 63 and 75 of the first and second parts 59 and 61, respectively, into facing contact and concentric with a common longitudinal axis 83. The tabs 77 of the second part protrude through corresponding openings 71 in the first part. Screws 85 pass through the slots 83 in the second part and thread into the bosses 73 of the first part. By rotating the two parts relative to each other about the axis 83, the spacings between the tabs 65 and 77 can be varied to assure that the tabs 65 and 77 simultaneously engage the spokes 34 of a particular wire wheel 29, FIG. 3. Tightening the screws 85 retains the two parts at the proper adjustment. The recess 79 provides clearance about the post 19 of the hub 13 when the first part notch 67 mates with the hub post. If desired, the two parts can have mating teeth that keep the parts oriented with respect to each other when screwed together. After adjustment and tightening, the operation of the adapter 57 is substantially identical to that of the single piece adapter 31.

In summary, the results and advantages of numerous existing MIG welding machines can now be further realized. The adapter 31 enables the welding machines to utilize weld wire 5 wound onto modern wire wheels 29. This desirable result comes from the combined functions of the adapter notch 43 and tabs 45, 45A. The notch mates with the post 19 of the hub 13, and the tabs engage spokes 34, 34A of the wire wheel. Accordingly, the wire wheel and hub rotate together without backlash. Frictional drag imposed on the hub against rotation is thus transmitted to the wire wheel, so that the weld wire does not coast and unravel the weld wire 5 during stop and start welding operations.

In addition, it will also be recognized that in addition to the superior performance of the adapter 31, its construction is such as to be of almost negligible cost in relation to the benefits it provides. Also, its installation is quick and simple, and it will provide indefinite service life.

Thus, it is apparent that there has been provided, in accordance with the invention, a weld wire adapter for MIG welders that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. An adapter for enabling a MIG welding machine to utilize a wire wheel that stores weld wire thereon, the wire wheel being assembled to a hub rotatable within the welding machine, the adapter comprising an annular section made of a thin piece of rigid material and having an internal diameter that is assemblable on the hub and an outer diameter, the annular section defining a notch that is mateable with a post on the hub such that the adapter and hub rotate together within the welding machine, the adapter further comprising at least one pair of tabs projecting from the annular section that simultaneously engage a pair of spokes on the wire wheel such that the adapter and the wire wheel rotate together without backlash within the welding machine.

2. The adapter of claim 1 wherein the adapter is made as a metal stamping, and wherein the tabs are bent from the adapter annular section.

3. In a MIG welding machine having a welding gun, a stationary shaft, a hub that rotates on the shaft, and means for imparting a frictional drag on the hub against rotation on the shaft, apparatus for supplying weld wire to the welding gun comprising:
 a. a wire wheel on the hub and having at least one pair of spokes, the weld wire being wound on the wire wheel;
 b. drive means for pulling the weld wire from the wire wheel and feeding the weld wire to the welding gun and thereby rotating the wire wheel; and
 c. adapter means interposed between the wire wheel and the hub for causing the wire wheel and hub to rotate without backlash on the shaft,
  so that the frictional drag on the hub is transmitted to the wire wheel by the adapter means to prevent coasting of the wire wheel and unraveling of the weld wire wound thereon during start and stop welding operations.

4. The welding machine of claim 3 wherein the adapter means comprises an adapter having an annular section with a notch that mates with the hub and tab means for engaging the spokes of the wire wheel.

5. The welding machine of claim 4 wherein the tab means comprises at least one pair of tabs projecting at approximately right angles to the adapter annular section.

6. The welding machine of claim 4 wherein the hub has a post that cooperates with the adapter notch and the adapter tabs cooperate with the wire wheel spokes to prevent backlash between the wire wheel and the hub.

7. The welding machine of claim 3 wherein the adapter means comprises:
 a. a first part comprising:
  i. an annular section with a notch that mates with the hub;
  ii. first tab means for engaging first spokes of a selected wire wheel; and
  iii. at least one threaded boss on the first part annular section;
 b. a second part comprising:
  i. an annular section in facing contact with the first part annular section and having a recess and at least one slot; and
  ii. tab means for engaging second spokes of the selected wire wheel, the second part being angularly adjustable relative to the first part to an operative adjustment whereat the first and second tab means simultaneously engage the first and second spokes, respectively, of the selected wire wheel; and
 c. at least one fastener passsing through the slot in the second part and threaded into the boss in the first part to thereby retain the first and second parts at the operative adjustment.

8. The welding machine of claim 7 wherein:
 a. the first tab means comprises at least one pair of first tabs projecting at approximately right angles from the first part annular section;
 b. the first part annular section defines at least one pair of openings; and
 c. the second tab means comprises at least one pair of second tabs projecting at approximately right angles from the second part annular section and protruding through corresponding openings in the first part annular section.

9. The welding machine of claim 7 wherein the second part annular section defines a recess that is generally aligned with the notch in the first part, the recess providing clearance with the hub when the first part notch mates with the hub.

10. An article of manufacture useful in a MIG welding machine for supplying weld wire wound on a spoked wire wheel to a welding gun without unraveling the weld wire from the wire wheel, the article of manufacture having an annular section with an inner diameter that assembles over a hub that rotates with a frictional drag in the welding machine, the annular section defining a notch that mates without backlash with a post on the hub, the article of manufacture further having tab means for engaging the wire wheel without backlash,
 so that the hub and wire wheel rotate together without backlash in the welding machine.

11. The article of manufacture of claim 10 wherein the annular section is formed from a thin piece of rigid material having opposed faces, and wherein the tab means projects from a selected face of the annular section.

12. The article of manufacture of claim 11 wherein the tab means comprises at least one pair of tabs that project at 90 degrees from the selected face to operatively engage selected spokes of the wire wheel.

13. An adapter useful in a MIG welding machine for supplying weld wire wound on a spoked wire wheel to a welding gun without unraveling the weld wire from the wire wheel, the adapter comprising:
 a. a first part having an inner diameter that assembles over a hub that rotates with a frictional drag in the welding machine, the first part defining a notch that mates without backlash with a post on the hub, the first part further having first tab means for engaging first spokes on the wire wheel; and
 b. a second part retained in facing contact with the first part and having an inner diameter assembled over the hub in the welding machine, the second part having second tab means for engaging second spokes of the wire wheel, the second part being angularly adjustable relative to the first part to enable the first and second tab means to simultaneously engage the first and second spokes of the wire wheel.

14. The adapter of claim 13 wherein:
 a. the first part comprises an annular section made of a thin piece of material and defining at least two openings therethrough, and wherein the first tab means comprises at least one pair of first tabs that project at approximately right angles from the annular section; and b. the second part comprises a second annular section made of a thin piece of material, and wherein the second tab means comprises at least one pair of second tabs that project at approximately right angles from the second annular section and that protrude through corresponding openings in the first part.

15. The adapter of claim 14 wherein the second annular section defines a recess that provides clearance with the hub post when the first and second parts are adjusted relative to each other.

* * * * *